(12) United States Patent
Preisler et al.

(10) Patent No.: US 8,834,985 B2
(45) Date of Patent: Sep. 16, 2014

(54) SANDWICH-TYPE COMPOSITE COMPONENT HAVING IMPRINTED 3-D STRUCTURES WHICH PROVIDE AT LEAST ONE PATTERN AT AN OUTER SURFACE OF THE COMPONENT

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 6 days.

(21) Appl. No.: 13/762,921

(22) Filed: Feb. 8, 2013

(65) Prior Publication Data
US 2014/0154461 A1    Jun. 5, 2014

Related U.S. Application Data

(63) Continuation-in-part of application No. 13/690,566, filed on Nov. 30, 2012, now Pat. No. 8,808,833.

(51) Int. Cl.
*B32B 3/26* (2006.01)
(52) U.S. Cl.
CPC ..................... *B32B 3/263* (2013.01)
USPC ........ 428/116; 296/39.1; 296/39.2; 296/39.3; 296/97.23; 428/95; 428/98; 428/99
(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS

| | | | |
|---|---|---|---|
| 5,502,930 A | 4/1996 | Burkette et al. | |
| 5,915,445 A | 6/1999 | Rauenbusch | |
| 6,050,630 A | 4/2000 | Hochet | |
| 6,102,464 A | 8/2000 | Schneider et al. | |

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

A sandwich-type composite component having imprinted 3-D structures which provide at least one pattern at an outer surface of the component is provided. The component includes a first outer layer having an outer surface, a second outer layer and a core positioned between the outer layers and having a large number of cavities. The outer layers are bonded to the core by press molding. The first outer layer comprises an integral, unitary structure including 3-D structures imprinted by the press molding. The 3-D structures are sized, shaped and arranged in one or more patterns at the outer surface. The one or more patterns may form a textural surface finish, a logo or indicia such as instructions at the outer surface. The component may be a vehicle interior component such as a vehicle load floor component.

23 Claims, 4 Drawing Sheets

(56) References Cited

U.S. PATENT DOCUMENTS

| | | |
|---|---|---|
| 6,435,577 B1 | 8/2002 | Renault |
| 6,537,413 B1 | 3/2003 | Hochet et al. |
| 6,655,299 B2 | 12/2003 | Preisler et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,790,026 B2 | 9/2004 | Vandangeot et al. |
| 6,823,803 B2 | 11/2004 | Preisler |
| 6,843,525 B2 | 1/2005 | Preisler |
| 6,890,023 B2 | 5/2005 | Preisler et al. |
| 6,981,863 B2 | 1/2006 | Renault et al. |
| 7,090,274 B1 | 8/2006 | Khan et al. |
| 7,419,713 B2 | 9/2008 | Wilkens et al. |
| 7,909,379 B2 | 3/2011 | Winget et al. |
| 7,919,031 B2 | 4/2011 | Winget et al. |
| 8,117,972 B2 | 2/2012 | Winget et al. |
| 8,622,456 B2 | 1/2014 | Preisler et al. |
| 8,690,233 B2 | 4/2014 | Preisler et al. |
| 2003/0079659 A1* | 5/2003 | Preisler et al. ............... 108/51.3 |
| 2005/0189674 A1 | 9/2005 | Hochet et al. |
| 2006/0255611 A1 | 11/2006 | Smith et al. |
| 2008/0185866 A1 | 8/2008 | Tarrant et al. |
| 2010/0026031 A1* | 2/2010 | Jouraku ..................... 296/37.16 |
| 2013/0278002 A1 | 10/2013 | Preisler et al. |
| 2013/0278003 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280469 A1 | 10/2013 | Preisler et al. |
| 2013/0280472 A1 | 10/2013 | Preisler et al. |
| 2013/0280473 A1 | 10/2013 | Preisler et al. |
| 2013/0312652 A1 | 11/2013 | Preisler et al. |
| 2013/0316123 A1 | 11/2013 | Preisler et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0145465 A1 | 5/2014 | Preisler et al. |
| 2014/0145470 A1 | 5/2014 | Preisler et al. |
| 2014/0147617 A1 | 5/2014 | Preisler et al. |
| 2014/0147622 A1 | 5/2014 | Preisler et al. |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

SANDWICH-TYPE COMPOSITE COMPONENT HAVING IMPRINTED 3-D STRUCTURES WHICH PROVIDE AT LEAST ONE PATTERN AT AN OUTER SURFACE OF THE COMPONENT

CROSS-REFERENCE TO RELATED APPLICATIONS

This application is a continuation-in-part application of U.S. patent application entitled "Compression-Molded Composite Component Having a Sandwich Structure and Having Integrally Formed Strengthening Structures" filed Nov. 30, 2012 and having U.S. Ser. No. 13/690,566. This application is filed on the same day as U.S. patent application entitled "Method of Making a Sandwich-Type, Compression-Molded Composite Component Having Improved Surface Appearance" Ser. No. 13/762,956.

TECHNICAL FIELD

This invention generally relates to compression-molded composite components having sandwich structures and, in particular, to such components which have imprinted integrally formed, 3-D structures which provide at least one pattern at outer surfaces of the components.

OVERVIEW

Compression molding has long been used to manufacture plastic parts or components. While widely used to manufacture thermoset plastic parts, compression molding is also used to manufacture thermoplastic parts. The raw materials for compression molding are typically placed in an open, heated mold cavity. The mold is then closed and pressure is applied to force the materials to fill up the entire cavity. A hydraulic ram or punch is often utilized to produce sufficient force during the molding process. The heat and pressure are maintained until the plastic materials are cured.

Two types of plastic compounds frequently used in compression molding are Bulk Molding Compound (BMC) and Sheet Molding Compound (SMC).

In general, compression molding provides good surface finish and can be applied to composite thermoplastics with woven fabrics, randomly oriented fiber mat or chopped strand. One of the problems associated with compression molding is that compression molding is thought to be largely limited to flat or moderately curved parts with no undercuts.

Vacuum during compression molding of thermoset parts has been used to minimize surface defects of the type known as porosity. Porosity is caused by air that is trapped between the molding compound (i.e. raw materials) and the surface of the mold cavity. The mold chamber or cavity is sealed from the surrounding atmosphere and then the chamber is evacuated before pressure is applied to the raw materials.

Some compression-molded composites combine a lightweight, low-density core with fiber-reinforced thermoplastic skins or outer layers thereby resulting in a sandwich structure. The resulting composite component has a high stiffness-to-weight ratio thereby making it desirable for use in a wide variety of applications including load-bearing applications. In general, the thicker the core, the higher the load-bearing capacity of the composite component.

As a result of their high stiffness-to-weight ratio and load-bearing capacity, such compression-molded composites have been used as load floors in automotive applications and as skis or snowboards (i.e., sliding boards) in recreational applications.

Figure 1:
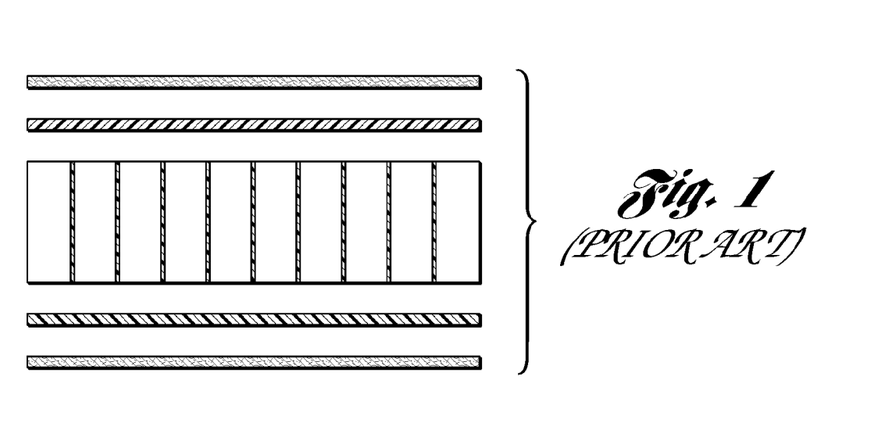
FIG. 1 is a side sectional view showing various separate layers of a prior art stack of thermoplastic-based layers of material.
Figure 2:
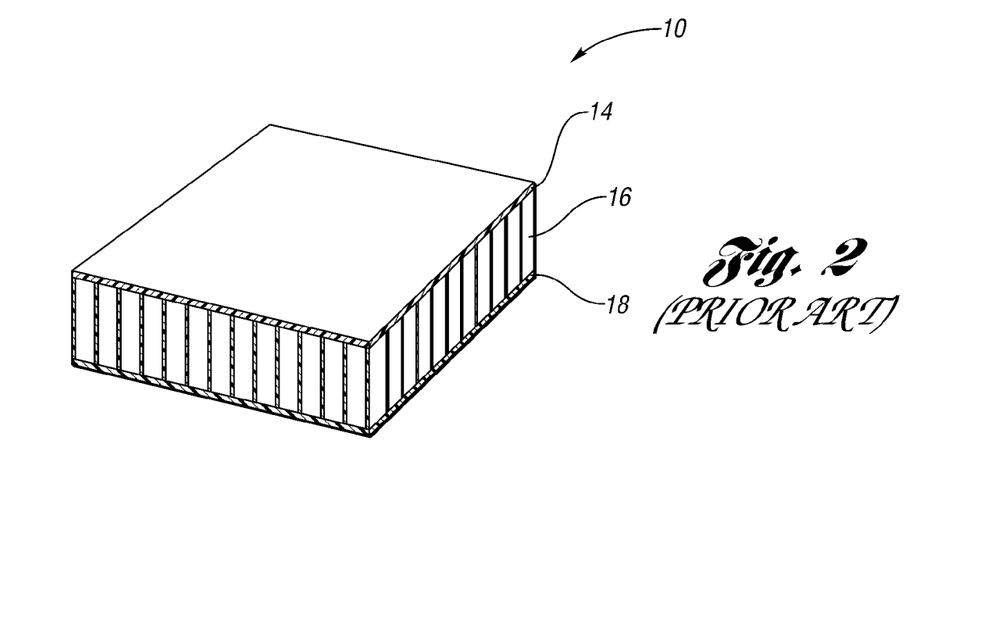
FIG. 2 is a top perspective sectional view of three central layers of the stack of FIG. 1 after low pressure, cold compression molding of the prior art.
Figure 10:
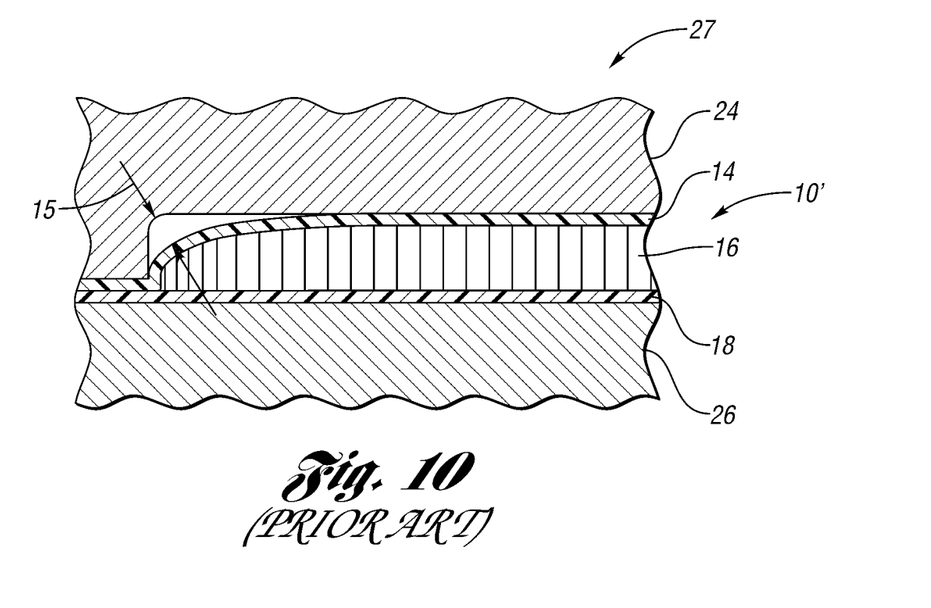
FIG. 10 is a view, partially broken away and in cross section, of a component during its compression molding in accordance with the prior art.

The prior art discloses a method of making a panel of sandwich-type composite structure having a cellular core in a single processing step. In that method, the panel such as a panel, generally indicated at 10 in FIG. 2, is made by subjecting a stack of layers of material to cold-pressing in a compression mold, such as the one generally indicated at 27 in FIG. 10. The mold 27 includes upper and lower dies 24 and 26. As shown in FIGS. 2 and 10, the stack is made up of: at least a first skin 14 made of a stampable reinforced thermoplastics material, a cellular core 16 made of a thermoplastics material, and a second skin 18 also made of a stampable reinforced thermoplastics material. The stack may also include one or more external covering layers (only FIG. 1) made of a woven or non-woven thermoplastic material. The skins 14 and 16 and core 16 are typically pre-heated outside the mold 27 to a softening temperature.

Such a method is particularly advantageous because of the fact that it makes it possible, in a single operation, to generate cohesion and bonding between the various layers of the composite component 10 shown in FIG. 2, and to shape the resulting component 10 while preserving all of the mechanical properties imparted by the cellular-core sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

Such rigidity characteristics, however, make it difficult to compression mold sharply angled, relatively small features into the component as illustrated at 15 in FIG. 10. The distance between the arrows 15 indicate the distance between the desired and actual shape of a molded composite component 10'.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance. Facing materials are widely used in motor vehicle construction.

In the automotive industry, it is common practice to refer to various surfaces as being A-, B-, or C-surfaces. As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors, examples include dashboards, instrument panels, steering wheels, head rests, upper seat portions, headliners, load floors and pillar coverings.

The following U.S. patent documents are related to the present invention: U.S. Pat. Nos. 7,419,713; 6,890,023; 6,843,525; 6,537,413; 6,050,630; and 2005/0189674.

Another problem associated with such composites is that their function and design freedom is limited by the material which make up the composites. For example, one or more additional components are typically required to add one or more patterns, such as style features at the outer surface of the component.

Other U.S. patent documents related to the present invention include: U.S. Pat. Nos. 5,502,930; 5,915,445; 6,102,464; 6,435,577; 6,655,299; 6,682,675; 6,748,876; 6,790,026; 6,682,676; 6,825,803; 6,981,863; 7,090,274; 7,909,379; 7,919,031; 8,117,972; 2006/0255611; and 2008/0185866.

SUMMARY OF EXAMPLE EMBODIMENTS

An object of at least one embodiment of the present invention is to provide a sandwich-type composite component having imprinted 3-D structures which provide at least one pattern at an outer surface of the component thereby reducing part count and manufacturing complexity.

In carrying out the above object and other objects of at least one embodiment of the present invention, a sandwich-type composite component having imprinted 3-D structures is provided. The component includes a first outer layer having an outer surface, a second outer layer, and a core positioned between the outer layers and having a large number of cavities. The outer layers are bonded to the core by press molding. The first outer layer comprises an integral, unitary structure including 3-D structures imprinted by the press molding. The 3-D structures are sized, shaped and arranged in at least one pattern at the outer surface.

The 3-D structures may provide a textured surface finish to the outer surface.

The 3-D structures may be embossed above or below the outer surface.

The 3-D structure may provide style features at the outer surface.

The at least one pattern may comprise a logo, a mark, a symbol, a graphic image or a monogram.

The at least one pattern may provide information at the outer surface.

The core may be a cellular core such a thermoplastic, honeycomb core.

The outer layers may be fiber-reinforced thermoplastic layers.

The first outer layer may be a load-bearing layer.

Each of the 3-D structures may have upper and side surfaces wherein a height of each of the 3-D structures is substantially equal to thickness of the first outer layer.

Each of the 3-D structures may have lower and side surfaces wherein a depth of each of the 3-D structures is substantially equal to thickness of the first outer layer.

The outer surface may be an A-surface.

Further in carrying out the above object and other objects at least one embodiment of the present invention, a sandwich-type, vehicle interior component having imprinted 3-D structures is provided. The component includes a first outer layer having an outer surface, a second outer layer and a core positioned between the outer layers and having a large number of cavities. The outer layers are bonded to the core by press molding. The first outer layer comprises an integral, unitary structure including 3-D structures imprinted by the press molding. The 3-D structures are sized, shaped and arranged in at least one pattern at the outer surface.

Still further in carrying out the above object and other objects of at least one embodiment of the present invention, a sandwich-type, vehicle load floor component having imprinted 3-D structures is provided. The component includes a first outer layer having an outer surface, a second outer layer and a core positioned between the outer layers and having a large number of cavities. The outer layers are bonded to the core by press molding. The first outer layer comprises an integral, unitary structure including 3-D structures imprinted by the press molding. The 3-D structures are sized, shaped and arranged in at least one pattern at the outer surface.

In each of the above-noted embodiments, each of the outer layers may comprise an integral, secondary structure including 3-D structures. The 3-D structures of each of the outer layers may be sized, shaped and arranged in one or more patterns at their respective outer surface.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
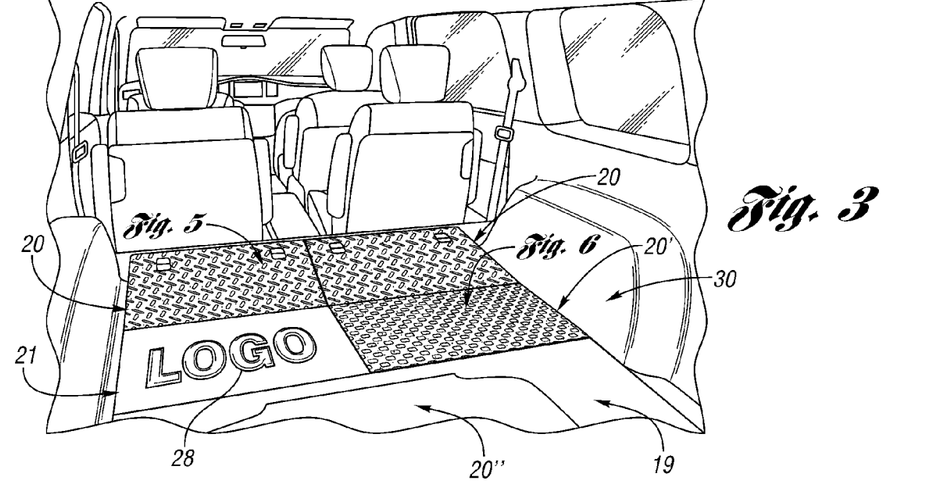
FIG. 3 is an environmental view, partially broken away, showing different sandwich-type composite components or panels having living hinges and 3-D structures; a hinged cover is shown in its closed position; the components of this Figure are constructed in accordance with at least one embodiment of the present invention wherein the 3-D structures provide one or more patterns at the outer surfaces of the components.
Figure 4:
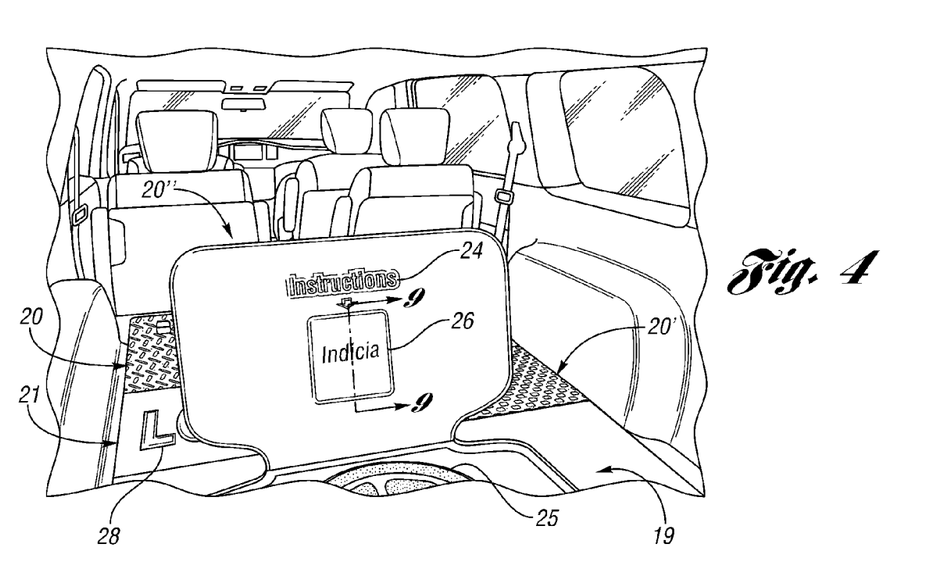
FIG. 4 is an environmental view, similar to the view of FIG. 3, with the cover of FIG. 3 in its open position to show its imprinted 3-D structures which convey information such as indicia and the word "instructions"

Referring now to the drawing figures, FIGS. 3 and 4 show a plurality of compression-molded, composite components, generally indicated at 19, 20, 20', 20" and 21, which make up an assembly such as a vehicle load floor assembly, generally indicated at 30, which may be positioned or supported at the rear of an automotive vehicle. Two of the components have the same reference number (20) since they are substantially identical. Each of the compression-molded composite components 19, 20, 20', 20" and 21, has a sandwich structure. The component 20" comprises a lid which is hingedly secured to the panel or component 19. The lid component 20" is shown in its closed position in FIG. 3 and in its open position in FIG. 4 to allow a stored vehicle component or load, such as a spare tire 25, to be accessed from a lower storage area in which the tire 25 is stored. On the undersurface of the lid component 20" the word "instructions" and indicia are imprinted during the compression molding process. The indicia may be information in the form of step-by-step instructions for changing a flat tire with the tire 25.

Figure 5:
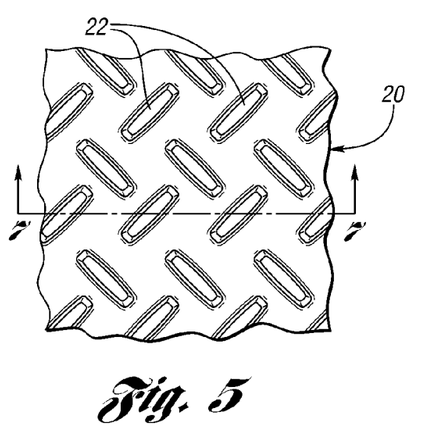
FIG. 5 is a plan view, partially broken away, of one of the components of FIG. 3.
Figure 7:
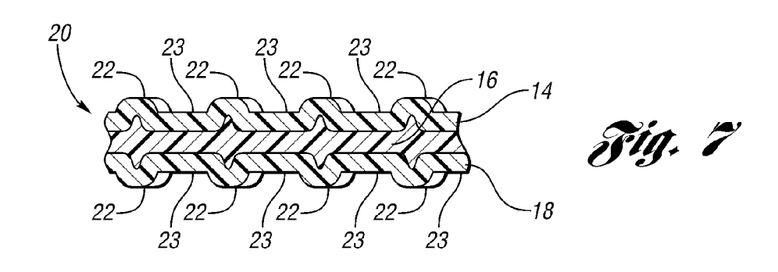
FIG. 7 is a side view, partially broken away and in cross section, of one embodiment of one of the components taken along lines 7-7 of FIG. 5 and showing 3-D structures embossed on both sides of the component.

FIGS. 5 and 7 provide more detailed views of the component 20 whose outer surfaces are provided with textured surface finishes by patterns of 3-D structures in the form of raised or embossed rectangular solids 22. The rectangular solids 22 of FIG. 5 are embossed above and below the outer surfaces of the component 20 as shown in FIG. 7 with respect to outer layers 14 and 18 of the component 20. The heights of the 3-D structures or rectangular solids 22 are substantially equal to the thicknesses of the outer layers 14 and 18 which typically is about 1 mm to 2 mm. The 3-D structures or solids 22 are formed during the compression molding process by locally crushing the stack of materials or layers 14 and 18 together with a cellular core 16 at locations 23. When so crushed, the cellular core may look like a sold plastic core as shown in FIG. 7 without any cavities.

Figure 6:
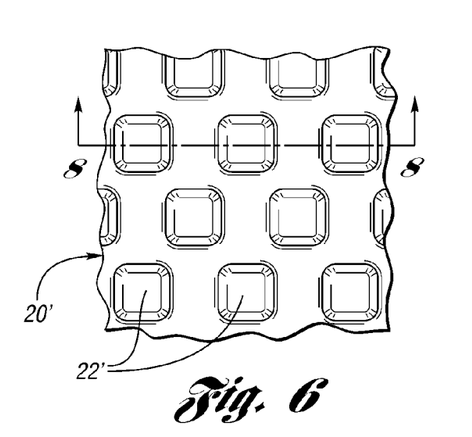
FIG. 6 is a plan view, partially broken away, of another one of the components of FIG. 3.
Figure 8:
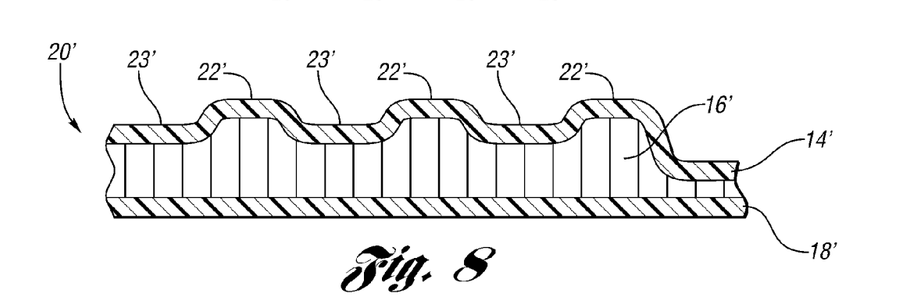
FIG. 8 is a view, similar to the view of FIG. 7, taken along lines 8-8 of FIG. 6 and showing 3-D structures, embossed on one side of the component.

FIGS. 6 and 8 provide views and structures similar to the views and structures of FIGS. 5 and 7, respectively. Consequently, the same reference numerals with a single prime designation are provided for similar structures.

Prior to compression molding, the core 16 of FIG. 7 (as well as the core 16' of FIG. 8) may be a cellular core having a thermoplastic honeycomb structure. The core 16 may also be made of polypropylene honeycomb, aluminum honeycomb, balsa and polyurethane foam. The resulting composite component or panel 20 (as well as the panel 20' of FIGS. 6 and 8) typically includes a lightweight, low density core such as the core 16 together with fiber-reinforced thermoplastic skins or layers such as the layers 14 and 18 (or layers 14' and 18' of FIG. 8). After compression molding the core 16 may have few, if any, cavities. Consequently, the core 16 is indicated at FIG. 7 as a solid plastic (as well as the core 16" of FIG. 9).

Figure 11:
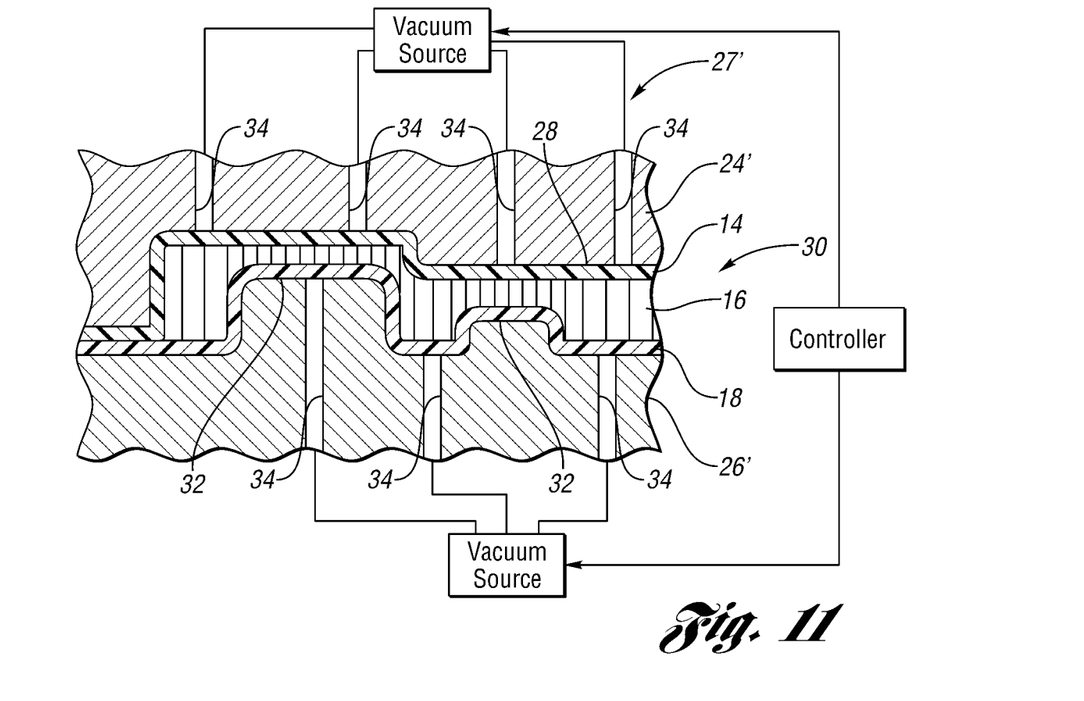
FIG. 11 is a view, similar to the view of FIG. 10, but showing a vacuum-assisted compression mold useful in imprinting 3-D structures in the outer layer(s) of compression-molded components of at least one embodiment of the present invention.

The composite component 20 (as well as the panels 19, 20', 21 and 22") may be compression or press molded using a variety of technologies which use a low temperature, compression molding apparatus but preferably uses the molding apparatus of FIG. 11. The core and the outer layers of the components 19, 20, 20', 20" and 21" are preferably generally of the type shown in U.S. Pat. Nos. 6,537,413; 6,050,630; and 2005/0189674.

After compression or press molding, raised portions or upper 3-D structures 22 are formed by the layer 14 at the upper support surface of the component 20. Also, lower portions or lower 3-D structures 22 are formed by the layer 18 diametrically opposite the 3-D structures 22 formed at the upper support surface. During such molding, portions of the core 16 at locations 23 between the upper 3-D structures 22 and at locations 23 between the lower 3-D structures 22 are crushed to reduce the thickness of those crushed areas to form corresponding, diametrically opposite, upper and lower surface portions at 23.

The raised portions 22 of the first outer layer 14 and the lower portions 22 of the second outer layer 18 are sized, shaped and arranged adjacent to each other in patterns to provide the component 20 with a textured surface finish at each of the outer layers 14 and 18. In effect, the raised portions 22 and portions at 23 in the outer layer 14 form an integral, unitary support structure and the lower portions 22 and the lower portions at 23 in the outer layer 18 form an integral, unitary support structure.

The above description is equally applicable to the component 20' of FIGS. 6 and 8 and, consequently, a single prime designation with the same reference number is used for the same or similar structures. In other words, the component 20' is similar to the component 20 of FIG. 7 in that the component 20' includes upper 3-D structures 22' as well as upper surfaces 23' between their corresponding 3-D structures 22'. However, only a single side of the component 20' is imprinted during compression molding rather than two sides as with the component 20. Also, the 3-D structures of FIG. 5 and their resulting pattern(s) are different.

Figure 9:
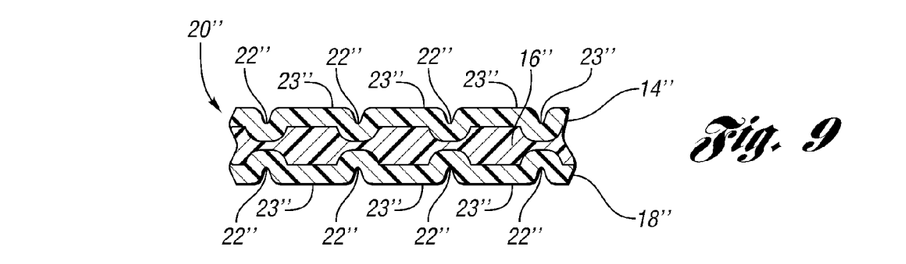
FIG. 9 is a view, similar to the views of FIGS. 7 and 8, which shows 3-D structures debossed below the outer surfaces of top and bottom layers of the lid component of FIGS. 3 and 4.

Referring to FIGS. 4 and 9, 3-D structures 22" are imprinted so as to form a plurality of patterns at the upper and lower surfaces of the lid component 20" to provide information at the outer surfaces of outer layers 14" and 18". The information may take the form of indicia 26 which collectively provide instructions for changing the tire 25. Also, the information may be in the form of the word "instructions" 26 spelled out and imprinted at the bottom surface of the lid component 20".

Similarly, 3-D structures in the form of a logo 28 (FIGS. 3 and 4) may be imprinted at a top surface of the component 21. The logo may identify the vehicle manufacturer or the manufacturer of the load floor 30. The 3-D structures may be sized, shaped and arranged in at least one pattern to take the form of the logo (as shown) or a mark, a symbol, a graphic image or a monogram.

Each resulting panel or component 20, 20', 20", 21 and 19 may have a thickness in the range of 5 to 25 mm.

In one example method of making a panel 30 of FIG. 11 (as well as the other above-noted components or panels), a stack of material is pressed in a low pressure, cold-forming mold, generally indicated at 27'. The stack is made up of the first layer or skin 14, the cellular core 16, and the second layer or skin 18. The stack is pressed at a pressure lying in the range of $10 \times 10^5$ Pa. to $30 \times 10^5$ Pa. The first and second skins 14 and 18, respectively, are preferably pre-heated to make them malleable and stretchable. Advantageously, in order to soften the first and second skins 14 and 18, respectively, heat is applied to a pre-assembly constituted by the stack made up of at least the first skin 14, of the cellular core 16, and the second skin 18 so that, while the panel 30 is being formed in the mold 27', the first and second skins 14 and 18 have a forming temperature lying approximately in the range of 160° C. to 200° C., and, in this example, about 180° C.

The living hinge between the lid panel 20" and the panel 19 of FIG. 4 can be formed in many different ways. For example, the living hinge can be formed by cutting through one of the outer layers and substantially through the core of the panel 20", as is well known in the art. Alternatively, the living hinge may be formed during the molding process.

The heated blank or stack is allowed to cool in the mold cavity of FIG. 11 in the closed position of a mold 27' until inner surfaces of the skins 14 and 18 are bonded to top and bottom surfaces of the core 16. A vacuum is applied at the first outer surface 28 of the blank or stack by an upper vacuum source through holes or passageways 34 formed through an upper die 24' of the mold 27' sufficient to help form (with the local crushing at locations 23 as shown in FIG. 7) the 3-D structures (22, 22' or 22") at the outer surface 28 of the first outer layer 14. Vacuum is applied by the upper vacuum source under control of a controller.

In like fashion, a vacuum is applied at the second outer surface 32 of the stack or blank by a lower vacuum source through holes or passageways 34 formed through a lower die 26' of the mold 27' to help form (with the local crushing at locations 23 as shown in FIG. 7) the 3-D structures (22, 22' or 22") at the outer surface of the second outer layer 18 during cooling. Vacuum is applied by the lower vacuum source under control of the controller.

The mold cavity of the mold 27' is preferably sealed from the atmosphere surrounding the mold 27' during the application of the vacuum at the upper and lower surfaces 28 and 32, respectively, by one or both of the skins 14 and 18 or by a separate, conventional seal (not shown) between the dies 24' and 26' of the mold 27'.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sandwich-type composite component having imprinted 3-D structures, the component comprising:
   a first outer layer having an outer surface;
   a second outer layer; and
   a core positioned between the outer layers and having a plurality of cavities, wherein the first outer layer and the second outer layer are bonded to the core by press molding and wherein the first outer layer comprises an integral, unitary structure including 3-D structures imprinted by the press molding, the 3-D structures being sized, shaped and arranged in at least one pattern at the outer surface and wherein the 3-D structures are either embossed above the outer surface or debossed below the outer surface.

2. The component as claimed in claim 1, wherein the 3-D structures provide a textured surface finish to the outer surface.

3. The component as claimed in claim 1, wherein the 3-D structures are embossed above the outer surface.

4. The component as claimed in claim 1, wherein the 3-D structures are debossed below the outer surface.

5. The component as claimed in claim 1, wherein the 3-D structures provide style features at the outer surface.

6. The component as claimed in claim 1, wherein the at least one pattern comprises a logo, a mark, a symbol, a graphic image or a monogram.

7. The component as claimed in claim 1, wherein the at least one pattern provides information at the outer surface.

8. The component as claimed in claim 1, wherein the core is a cellular core.

9. The component as claimed in claim 1, wherein the core is a thermoplastic core.

10. The component as claimed in claim 1, wherein the core is a honeycomb core.

11. The component as claimed in claim 10, wherein the honeycomb core is a thermoplastic honeycomb core.

12. The component as claimed in claim 1, wherein the outer layers are fiber-reinforced thermoplastic layers.

13. The component as claimed in claim 1, wherein the first outer layer is a load-bearing layer.

14. The component as claimed in claim 3, wherein each of the 3-D structures has upper and side surfaces and wherein a height of each of the 3-D structures is substantially equal to thickness of the first outer layer.

15. The component as claimed in claim 4, wherein each of the 3-D structures has lower and side surfaces and wherein a depth of each of the 3-D structures is substantially equal to thickness of the first outer layer.

16. The component as claimed in claim 1, wherein the outer surface is an A-surface.

17. A sandwich-type, vehicle interior component having imprinted 3-D structures, the component comprising:
   a first outer layer having an outer surface;
   a second outer layer; and
   a core positioned between the first outer layer and the second outer layer and having a plurality of cavities, wherein the outer layers are bonded to the core by press molding and wherein the first outer layer comprises an integral, unitary structure including 3-D structures imprinted by the press molding, the 3-D structures being sized, shaped and arranged in at least one pattern at the outer surface and wherein the 3-D structures are either embossed above the outer surface or debossed below the outer surface.

18. The component as claimed in claim 17, wherein the first outer layer has a first outer surface and the second outer layer has a second outer surface and wherein each of the outer layers comprises an integral, unitary structure including 3-D structures imprinted by the press molding, the 3-D structures being sized, shaped and arranged in at least one pattern at their respective outer.

19. A sandwich-type, vehicle load floor component having imprinted 3-D structures, the component comprising:
   a first outer layer having an outer surface;
   a second outer layer; and
   a core positioned between the first outer layer and the second outer layer and having a plurality of cavities, wherein the outer layers are bonded to the core by press molding and wherein the first outer layer comprises an integral, unitary structure including 3-D structures imprinted by the press molding, the 3-D structures being sized, shaped and arranged in at least one pattern at the outer surface and wherein the 3-D structures are either embossed above the outer surface or debossed below the outer surface.

20. The component as claimed in claim 19, wherein the first outer layer has a first outer surface and the second outer layer has a second outer surface and wherein each of the outer layers comprises an integral, unitary structure including 3-D structures imprinted by the press molding, the 3-D structures being sized, shaped and arranged in at least one pattern at their respective outer surface.

21. A sandwich-type composite component having imprinted 3-D structures, the component comprising:
   a first outer layer having an outer surface;
   a second outer layer; and a core positioned between the outer layers and having a plurality of cavities, wherein the outer layers are bonded to the core by press molding and wherein the first outer layer comprises an integral, unitary structure including 3-D structures imprinted by the press molding, the 3-D structures being sized, shaped and arranged in at least one pattern at the outer surface and wherein the 3-D structures provide a textured surface finish to the outer surface.

22. A sandwich-type composite component having imprinted 3-D structures, the component comprising:

a first outer layer having an outer surface;

a second outer layer; and a core positioned between the outer layers and having a plurality of cavities, wherein the outer layers are bonded to the core by press molding and wherein the first outer layer comprises an integral, unitary structure including 3-D structures imprinted by the press molding, the 3-D structures being sized, shaped and arranged in at least one pattern at the outer surface and wherein the 3-D structures provide style features at the outer surface.

23. A sandwich-type composite component having imprinted 3-D structures, the component comprising:

a first outer layer having an outer surface;

a second outer layer; and a core positioned between the outer layers and having a plurality of cavities, wherein the outer layers are bonded to the core by press molding and wherein the first outer layer comprises an integral, unitary structure including 3-D structures imprinted by the press molding, the 3-D structures being sized, shaped and arranged in at least one pattern at the outer surface and wherein the at least one pattern comprises a logo, a mark, a symbol, a graphic image or a monogram.

* * * * *